July 22, 1930.  W. S. NEAL  1,771,137
TREE FELLING SAW GUIDE AND REST
Filed July 30, 1929
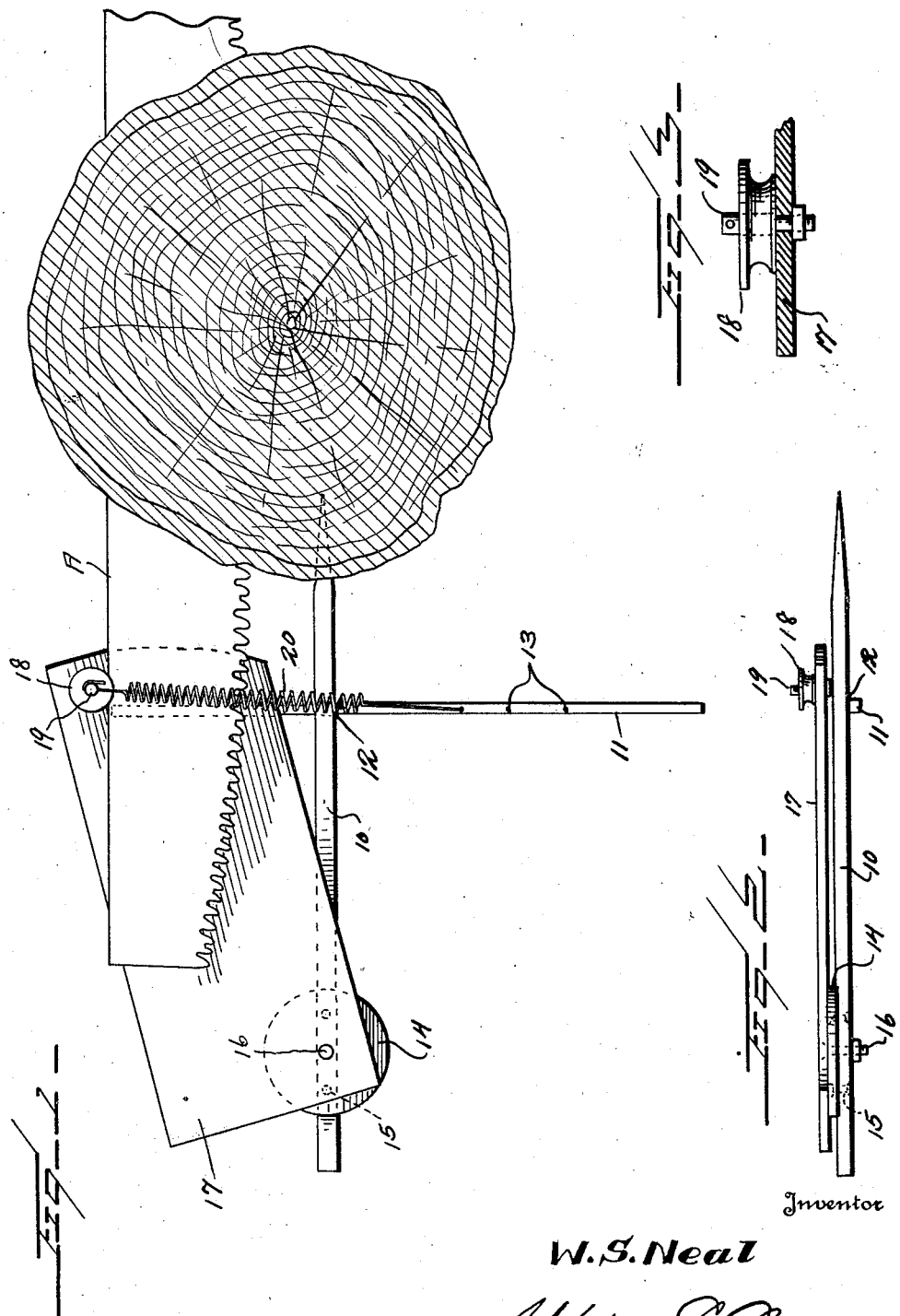
Inventor
W. S. Neal
By Watson E. Coleman
Attorney Patented July 22, 1930

1,771,137

UNITED STATES PATENT OFFICE

WALTER S. NEAL, OF GRANGEVILLE, IDAHO

TREE-FELLING SAW GUIDE AND REST

Application filed July 30, 1929. Serial No. 382,155.

This invention relates to devices for supporting a cross cut saw while the saw is being used in felling a tree.

The general object of the invention is to provide a very simple device of this character which may be readily put in place, which will support and constitute a rest for the saw while it is being operated, which will guide the saw, and which will act to feed the saw against the tree trunk.

My invention is illustrated in the accompanying drawings, wherein:—

Figure 1 is a top plan view of a tree felling saw constructed in accordance with my invention, the tree being shown in section;

Figure 2 is a side elevation of my saw guide;

Figure 3 is a fragmentary section through the supporting member and the roller.

Referring to these drawings, 10 designates a steel bar which is pointed at one end so that it may be driven into the tree trunk. This bar is preferably about three feet long and has welded to it the transverse bar 11 welded at the point 12. This transverse bar 11 on one side of its intersection with the bar 10 is formed with a plurality of openings 13.

Mounted upon the bar 10 adjacent that end remote from the pointed end of the bar is a metallic disk 14 which is riveted at 15 to the bar.

Pivotally mounted upon this disk by means of a bolt 16 is a plate or board 17 which constitutes the saw rest. This board is pivotally mounted upon the bolt 16 so as to swing and is provided at its corner remote from the bolt 16 with the roller 18 adapted to bear against the edge of the saw A. This roller is mounted upon a bolt 19 or is otherwise supported upon the bolt or plate 17. Connected to the bolt 19 is a contractile spring 20 whose outer end is hooked for engagement through any of the holes 13.

It will be seen that with this construction the bar 10 may be driven into the tree trunk at any desired point and that when in position, the board or plate 17 will be supported upon this bar 10 and upon the bar 13 and that the free end of the board or plate 17 will be urged inward by the spring 20, the roller 18 bearing against the butt end of the saw A. Thus the saw will be urged against the work with a pressure determined by the adjustment of the spring in one or another of the apertures 13. The plate 17 will swing as the saw is reciprocated so that the roller 18 will follow the movements of the saw and exert a constant pressure against the saw while at the same time the saw blade will be supported by the board 17 on a rest.

I claim:—

1. A saw guide and rest for tree felling comprising a pointed bar adapted to be driven into a tree trunk, a cross bar integrally connected thereto and extending transversely thereof and provided with a plurality of holes, a disk mounted upon the first named bar, a plate pivotally mounted upon the first named bar and disk, and resting upon the disk, the free end of the plate carrying a roller adapted to bear against the back of a cross cut saw with the plate beneath the saw, and a coiled contractile spring operatively connected to said plate and at its free end engageable with any one of the openings in said cross bar whereby the spring may be tensioned.

2. A saw guide and rest for tree felling comprising a pointed bar adapted to be driven into a tree trunk, a saw supporting plate swingingly mounted upon said bar, a roller mounted upon the free end of the plate and adapted to bear against the back of a saw, and a spring operatively engaged with the plate and urging the plate in a direction to carry the roller against the back of the saw and urging the saw into the work, the roller being disposed diagonally with reference to the pivotal center of the plate, whereby the plate will act to afford a support for the saw.

In testimony whereof I hereunto affix my signature.

WALTER S. NEAL.